2 Sheets--Sheet 1.
G. H. GRIGGS.
Improvement in Spark-Arresters and Consumers.
No. 5,051. Reissued Sep. 10, 1872.
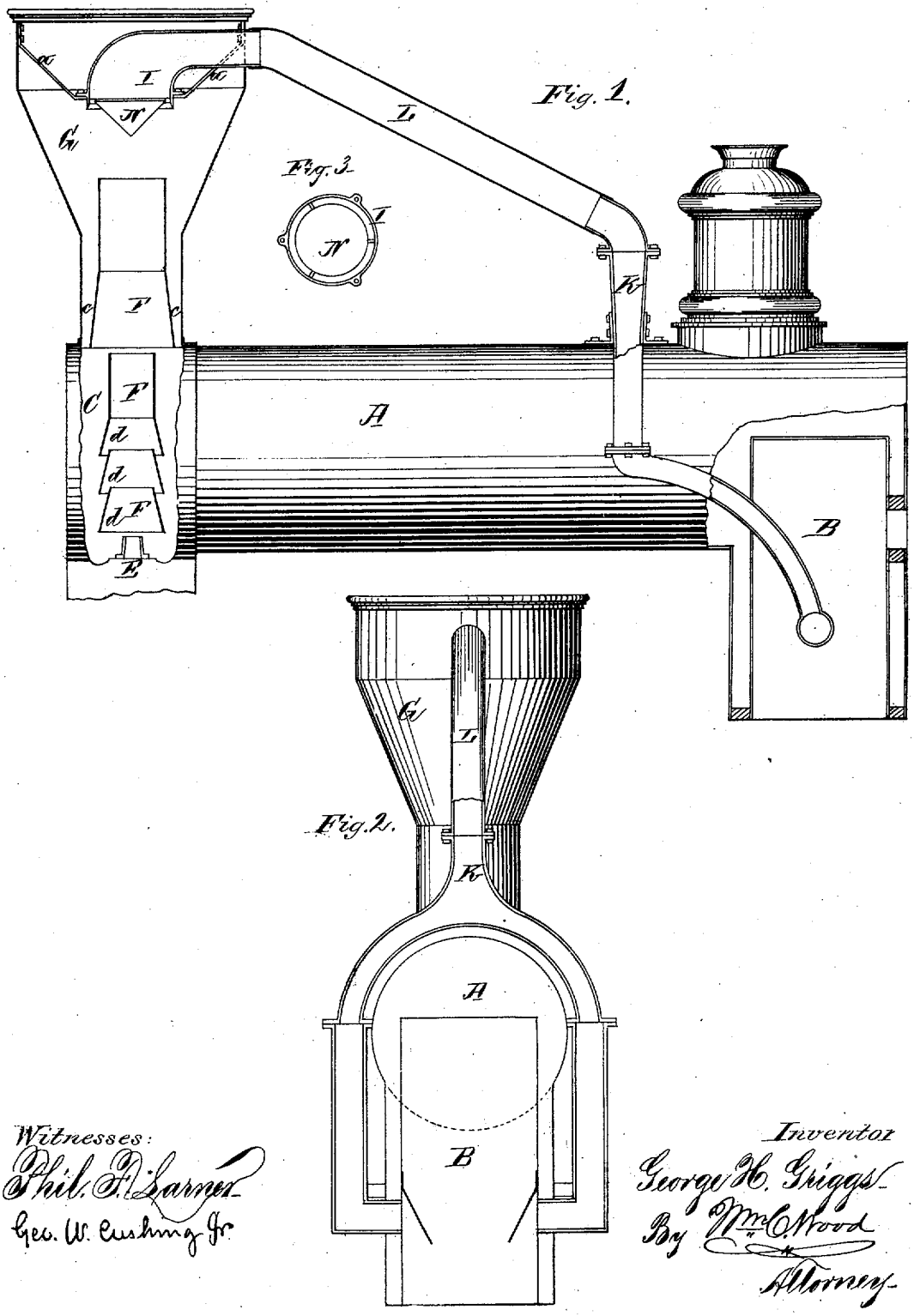
Witnesses:
Phil. F. Larner
Geo. W. Cushing Jr.
Inventor
George H. Griggs
By Wm. C. Wood
Attorney.
N. PETERS, PHOTO-LITHOGRAPHER, WASHINGTON, D. C.

2 Sheets--Sheet 2.
G. H. GRIGGS.
Improvement in Spark-Arresters and Consumers.
No. 5,051. Reissued Sep. 10, 1872.
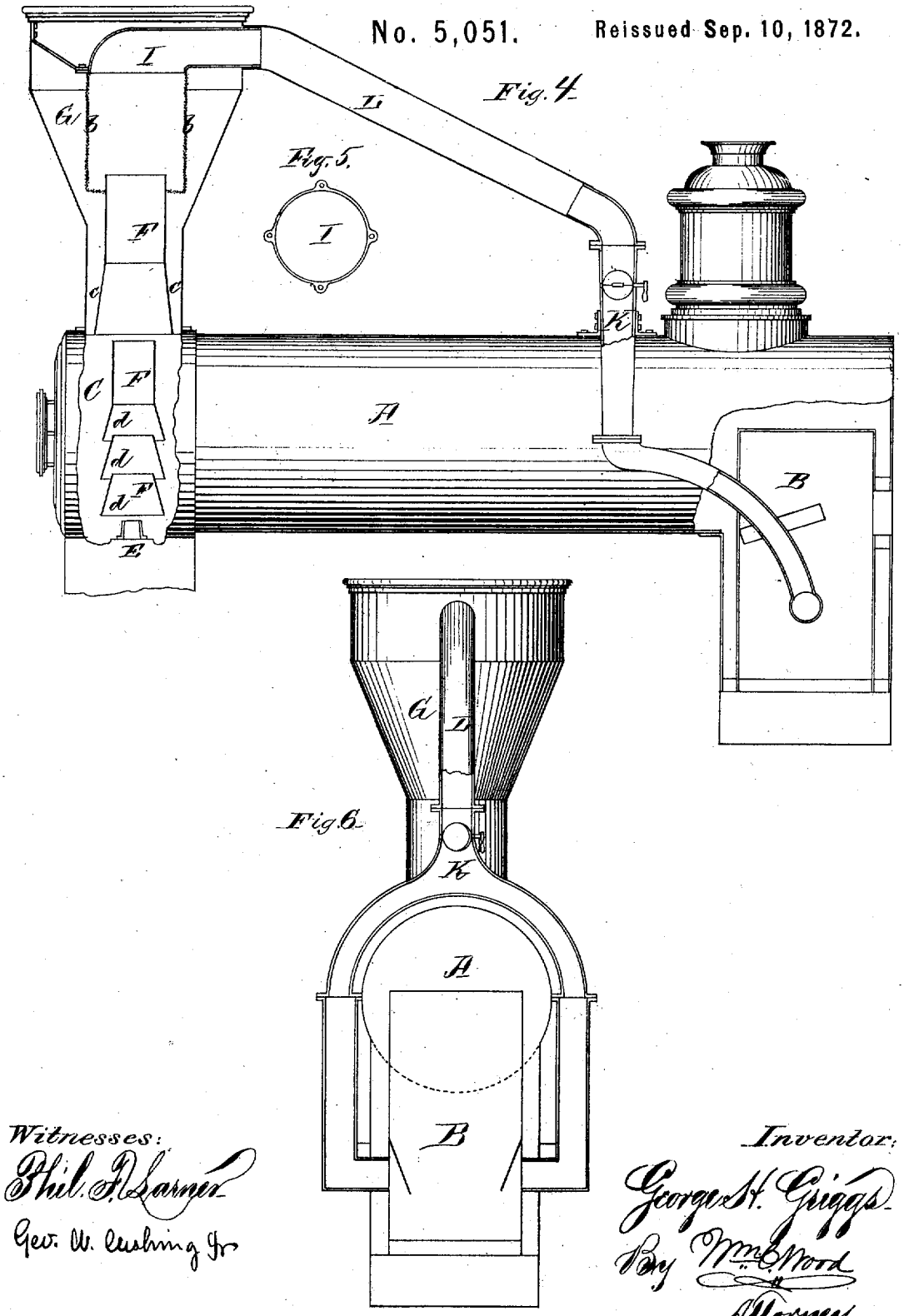
Witnesses:
Phil. F. Larner
Geo. W. Cushing Jr.
Inventor:
George H. Griggs
By Wm. C. Wood
Attorney
N. PETERS, PHOTO-LITHOGRAPHER, WASHINGTON, D. C.

UNITED STATES PATENT OFFICE.

GEORGE H. GRIGGS, OF WHITESTONE, NEW YORK, ASSIGNOR TO CHARLES F. PIKE.

IMPROVEMENT IN SPARK ARRESTERS AND CONSUMERS.

Specification forming part of Letters Patent No. 120,637, dated November 7, 1871; reissue No. 5,051, dated September 10, 1872.

DIVISION B.

Be it known that I, GEORGE H. GRIGGS, of the town of Whitestone, Queens county, and State of New York, (formerly of the city and county of Worcester, in the State of Massachusetts,) have invented a certain new and useful Improvement in Spark Arresters and Consumers for Locomotives, &c.

My improvement relates to, and is applicable particularly to, that class of locomotive and other steam-boilers which have a draft created in their flues by the intermittent or continuous vacuum created or caused by a forced blast discharged in the smoke-arch, or in a compound smoke and blast pipe, in the direction of, or corresponding with, the natural line of the draft. This division of the invention consists, first, in a novel combination of a spark or return flue, the ends of which are connected, respectively, with the fire-chamber and smoke-stack of a boiler, and a compound-blast pipe, when the mouth of the former is placed above, adjacent to, and coincident with, the exit-aperture of the latter, whereby a portion of the compound blast, composed of steam, air, and the unconsumed products of combustion, will be, on leaving the blast-pipe, forced directly into the mouth of the return-flue, and driven through it into the furnace by the force and presence therein of succeeding portions of the blast; secondly, in a novel combination, within a smoke-stack, of a compound-blast pipe, the mouth of a spark-flue, and a guiding-plate located within, or adjacent to, the mouth of the return-flue, and in arranging the mouth of the spark-flue and its guiding-plate with such relation to the exit-aperture of the blast-pipe that more or less of the compound blast may be directed into the mouth of the spark-flue in a solid, unbroken, or concentrated volume; thirdly, in a novel combination, within an exterior stack, of an interior compound-blast pipe, a bell-shaped mouth-piece of a spark-flue, and a barrel-netting connecting the exit-aperture of the blast-pipe and the mouth of the spark-flue, whereby a portion of the gaseous elements in the compound blast may freely escape by lateral expansion, while all the solid and a portion of the gaseous unconsumed products of combustion will be forced directly into the mouth of and through the return-flue; and I do hereby declare that the following specification, taken in connection with the drawing furnished and forming a part of the same, is a clear, true, and exact description of a locomotive-boiler embodying my invention.

The practical effect of my invention is to convey to the fire-chamber the sparks and cinders, and a considerable proportion of the gas and smoke which would otherwise be discharged from the smoke-stack, not only resulting in economy in the consumption of fuel, but in the avoidance of the inconvenience and danger accruing from flying sparks and cinders.

Referring to the drawing, Figure 1, Sheet 1, represents, partially in side view and partially in longitudinal vertical section, a locomotive-boiler. Fig. 2 represents the same partially in rear end view and partially in cross vertical section. Fig. 3 represents the mouth of the return or spark flue and its guiding-plate as if viewed from below. Fig. 4, Sheet 2, represents, in the same manner as in Fig. 1, a locomotive-boiler with some slight modifications, but involving my invention. Fig. 5 represents the mouth of the return-flue without a guide-plate, and as if viewed from below. Fig. 6 represents the boiler and stack of Fig. 4, partially in rear-end view and partially in cross vertical section.

In all the figures, A denotes the boiler. B denotes the fire-box, and C the smoke-arch. E denotes the exhaust-pipe, which projects upward into the smoke-arch, and communicates with the cylinder of the locomotive. F denotes a compound-blast pipe, possessing no novel features. As represented in the drawing, the lower portion of the blast-pipe is composed of three petticoats, *d*, arranged and connected in a manner well known. The upper petticoat is provided with a longer neck than either of the others, which extends to near the lower end of, and is coincident with, the center of the upper or main section of the blast-pipe. Although made in four pieces, as shown, they are all connected, and constitute, as a whole, a compound-blast pipe, through which the compound blast, composed of the steam-blast, air, smoke, gas, cinders, &c., is driven and discharged from the smoke-arch. G denotes an exterior smoke-stack of usual form. Within the stack, and surrounding the base of the upper section of the pipe F, is an annular space, *c*, by which the smoke-arch and the interior of the stack G are connected. As usual in such stacks, it is surmounted by a crown-netting. I denotes the mouth-piece of the spark-flue. It is represented as partially bell-mouthed, and partially horizontal. It extends from a point near the center of the stack through its rear side near the top. It is secured to the stack in proper position by the braces *a*. Its bell-mouth opens downward directly above, and is coincident with, the exit-aperture of the compound-blast pipe F, with a sufficient vertical distance between them to admit of the free lateral expansion of the uprising blast. L denotes the return or spark flue, which is connected at its upper end with its mouth-piece I. At its lower end it branches to the right and left at the point K, near the top of the boiler, into two flues, both of which enter the fire-chamber above the grate, one on each side. At the point K, as shown in Fig. 4, Sheet 2, a damper is placed within a spark-flue, so that communication through it may be cut off when the engine is at rest, or whenever it may be found desirable. As shown in Fig. 4, Sheet 2, the horizontal portion of the mouth-piece may be well entered into the upper end of the return-flue, and the two made of such size that there will be a narrow annular space between them, through which more or less of the smoke or cinders may be drawn from the adjacent portion of the smoke-stack by the action of the driven blast through the spark-flue. N, in Figs. 1 and 2, Sheet 1, denotes an annular guiding-plate in the form of an inverted cone. It is secured to and within the bell-mouth of the piece I, with its conical point extending downward toward the exit-aperture of the blast-pipe. Surrounding the base of this inverted conical guiding-plate is an annular space between its edges and the inside of the mouth-piece, into and through which more or less of the ascending blast is directed in a concentrated volume. By its form it also induces in the blast, to a greater or less extent, a free lateral expansion.

When the parts are arranged as shown in Fig. 1, Sheet 1, the usual crown-netting on the stack prevents the exit of such sparks as are not driven into the mouth-piece, and, after striking the netting, they will fall, to be taken up again within the blast-pipe.

In Fig. 4, Sheet 2, the exit-aperture of the blast-pipe and the mouth-piece of the spark-flue are shown as if separated by a greater space, although, as before, placed coincident. The guiding-plate is also dispensed with. The mouth-piece and the blast-pipe are operatively connected, however, by a barrel-netting, *b*. The increased vertical space between the mouth-piece and blast-pipe admits of the comparatively free lateral expansion of the ascending blast through the sides of the barrel-netting, which, while it will not admit the sparks and cinders to escape, will allow the gaseous matter and steam to pass through its sides, and thus allow the engine to free itself without undue labor from the burden of exhaust steam. When arranged in this manner, the usual crown-netting on the exterior stack may or may not be dispensed with. The guiding-plate N and the barrel-netting *b* may both be dispensed with, and the apparatus will then effect approximately desirable results, although the barrel-netting and the usual crown-netting, if used together, will afford absolute security against the escape of burning and dangerous sparks.

The operation of an apparatus involving my invention, and constructed and arranged as shown, would be as follows: When the engine was at rest the smoke and gases would leave the fire-chamber, pass through the flues, and escape through the smoke-arch and stack in the usual manner. Such sparks and cinders as should at such time, perchance, pass through the flues would either be at once deposited on the floor of the smoke-arch, or carried up to the usual crown-netting on the stack, and, being prevented from escaping, would fall to the smoke-arch. As soon as the engine was put in motion, and the exhaust steam discharged through the pipe E up through the petticoats *d* and the compound-blast pipe F, it would cause a vacuum in the smoke-arch and induce a powerful draft through the flues of the boiler. All the smoke, gas, cinders, &c., leaving the flues would be drawn into the blast-pipe F, between the several petticoats, and, uniting with the steam, be forced upward, and constitute a compound blast, in a manner well known. As the mouth of the return or spark flue is coincident with the exit-aperture of the blast-pipe, more or less of the compound blast would be discharged directly from the blast-pipe into the mouth of the spark-flue, and, as it could not retreat therefrom, it would be driven by the next succeeding portion of the blast farther into and through the flue, and cause it to be discharged continuously into the fire-chamber. So long as the engine continued in motion, and was using steam, so long would this operation be continued, or, at least, so long as the spark-flue remained open. In their passage from the smoke-stack to the fire-chamber the "sparks" or cinders and the gases are rendered highly combustible by the decomposition of the steam, and by the heat of the driven blast, so that they enter the fire-chamber thoroughly ripe for final combustion.

I am aware that sparks, gas, smoke, &c., have been conducted to, and conveyed through, flues connecting the smoke-stack with the furnace by means of such special mechanical appliances as fans, blowers, &c., which, after taking into their custody the unconsumed products of combustion, would discharge them through pipes connected therewith to the furnace. I am also aware that at least in one instance it has been proposed to connect the top of the smoke-stack with the furnace by means of a horizontal flue extending from the stack to the top of the cab, the rear end to be connected to the fire-chamber by vertical pipes. In such case it was also proposed to have the upper side of said horizontal flue composed principally of wire-netting sufficiently fine to prevent the exit of sparks and cinders, and at the same time open enough to admit of the free discharge of the steam, gas, and smoke. In practice the apparatus was expected to convey the sparks to that portion of the horizontal flue above the cab, from which they were expected to fall, by their own gravity, down the vertical pipes into the fire-chamber. I am also aware that a return-flue, furnace, smoke-stack, compound-blast pipe, and bell-mouthed pipe have, before my invention, been combined in an apparatus intended to convey sparks, &c., from the smoke-stack to the furnace. The apparatus containing said devices, however, differed from mine in these important points: The bell-mouthed pipe was not connected to the return-flue. The bell-mouth of the pipe opened upward, and was not coincident with the exit-aperture of the blast-pipe, and although, by means of a deflecting-plate, more or less of the sparks were made, by a complete reversal in direction, to enter an annular space in the pipe, most of them fell outside of the bell-mouth, on an inclined plate below and within a netting of ordinary construction. Down this plate the sparks were inclined, by their own gravity, to the mouth of the spark-flue, down which their movements were accelerated by a current of air entering funnel-shaped pipes opened to the front, through which, into the spark-flue, more or less air was forced with more or less velocity, dependent wholly upon the rate of speed at which the engine might be moving. I am not aware, however, that before my invention sparks, smoke, and other solid or gaseous unconsumed products of combustion have ever been controlled by directing them, while constituting a portion of the compound blast, into the mouth of a spark-flue in such a manner that said unconsumed products, after having so entered the mouth of said flue, could be driven by the force of the succeeding intermittent or continuous action of the blast through the flue and into the fire-chamber; and I therefore claim as new, and desire to secure by Letters Patent—

1. The combination of the compound-blast pipe with a spark or return flue communicating with the fire-chamber, provided with a bell-shaped mouth, which is located above, adjacent to, and coincident with, the exit-aperture of the blast-pipe, substantially as and for the purposes specified.

2. The combination of the compound-blast pipe, the spark or return flue, provided with a bell-shaped mouth, and a guiding-plate located adjacent to or within the mouth of the return-flue, and coincident with the exit-aperture of the blast-pipe, substantially as and for the purposes specified.

3. The combination, within a smoke stack, of the compound-blast pipe, the bell-mouth of the spark-flue, and the barrel-netting connecting the two, substantially as and for the purposes specified.

GEO. H. GRIGGS.

Witnesses:
WM. C. WOOD,
GEO. W. CUSHING, Jr.